(12) United States Patent
Guo et al.

(10) Patent No.: US 7,480,271 B2
(45) Date of Patent: Jan. 20, 2009

(54) METHOD FOR REDUCING MULTI-CELL INTERFERENCES IN WIRELESS COMMUNICATIONS

(75) Inventors: Li Guo, Irving, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 125 days.

(21) Appl. No.: 11/711,202

(22) Filed: Feb. 26, 2007

(65) Prior Publication Data

US 2008/0075037 A1    Mar. 27, 2008

Related U.S. Application Data

(60) Provisional application No. 60/847,182, filed on Sep. 26, 2006.

(51) Int. Cl.
*H07Q 7/20* (2006.01)
(52) U.S. Cl. ...................................... 370/329
(58) Field of Classification Search ................ 370/329, 370/341, 346–347; 455/101, 103, 134, 150.1, 455/154.1, 561, 562.1, 464, 450, 509; 375/267, 375/299, 347
See application file for complete search history.

(56) References Cited

U.S. PATENT DOCUMENTS

| | | | |
|---|---|---|---|
| 2002/0027957 A1* | 3/2002 | Paulraj et al. | 375/267 |
| 2003/0073463 A1 | 4/2003 | Shapira | 455/562 |
| 2006/0079289 A1* | 4/2006 | Lewis | 455/562.1 |
| 2006/0135164 A1* | 6/2006 | Kim et al. | 455/436 |

* cited by examiner

*Primary Examiner*—CongVan Tran
(74) *Attorney, Agent, or Firm*—Edell, Shapiro & Finnan, LLC

(57) ABSTRACT

A method is provided for reducing multi-cell interference. The method comprises dividing a cell into a plurality of segments, partitioning a frequency spectrum into a plurality of sub-channels, assigning one or more sub-carriers to each of the plurality of sub-channels, assigning a predetermined sub-channel as a primary channel to a predetermined segment, determining which of the plurality of the segments a desired communicating wireless mobile station enters, calculating a first spatial signature of desired signals from the desired communicating wireless mobile station, calculating a second spatial signature of interference signals from a plurality of non-communicating wireless mobile stations in one or more neighboring cells, and generating a null-steering beamforming weighting vector from the first and second spatial signatures.

28 Claims, 5 Drawing Sheets

200

METHOD FOR REDUCING MULTI-CELL INTERFERENCES IN WIRELESS COMMUNICATIONS

CROSS REFERENCE

The present application claims the benefit of U.S. Provisional Application Ser. 60/847,182, which was filed on Sep. 26, 2006.

BACKGROUND

In a wireless communications network, it is very common for a wireless station to experience multi-cell interference when the radio signals, transmitted by a mobile wireless station (MS) or a base transceiver station (BTS) from the neighboring cells, spill over and impair the channel condition of the wireless station. Multi-cell interference limits both the capacity and coverage of a wireless communications network. The problem of multi-cell interference is especially severe when a frequency re-use factor is small.

Various techniques have been developed to reduce multi-cell interference in a wireless communications network. One of the techniques uses a different pseudorandom noise offset (PN offset) for each cell and another uses a different frequency offset for each cell. Yet another uses a directional antenna on an MS.

The PN offset technique is mainly used in a spread spectrum communications network. This technique makes interference energy spread out over a wider spectrum, instead of trying to reduce it. As a result, interference energy has the same effect as thermal noises do. When the PN offset technique is used, the degree of isolation among cells depends on the spreading gain of the wireless communications network.

The frequency offset technique assigns different frequencies to different cells. The multi-cell interference among cells is reduced because the interference signals do not appear on the same frequency as the desired signals. The disadvantage of this technique is that spectrum usage efficiency is reduced. For example, in a wireless communications network with a frequency re-use factor of 3, spectrum usage efficiency is reduced by a factor of 3.

The directional antenna technique is to have a directional antenna on an MS positioned toward the direction of arrival of desired signals and away from interference signals, which are the signals transmitted from other cells. The impact of the interference signals on a wireless station is thus reduced. However, a disadvantage of this technique is that the directional antenna is bulky and expensive; therefore, it is not practical for mobile users.

As such, what is desired is an effective and practical method for reducing the multi-cell interference in a wireless communications network in order to improve the network's capacity and coverage.

SUMMARY

A method is provided for reducing multi-cell interference. The method involves dividing a cell into a plurality of segments, partitioning a frequency spectrum into a plurality of sub-channels, assigning one or more sub-carriers to each of the plurality of sub-channels, assigning a predetermined sub-channel as a primary channel to a predetermined segment, determining which of the plurality of the segments a desired communicating wireless mobile station enters, calculating a first spatial signature of desired signals from the desired communicating wireless mobile station, calculating a second spatial signature of interference signals from a plurality of non-communicating wireless mobile stations in one or more neighboring cells, and generating a null-steering beamforming weighting vector from the first and second spatial signatures.

DESCRIPTION

The method disclosed herein is applicable to any multiple access technique that uses some type of frequency division for multiple access channelization. This includes frequency division multiple access (FDMA), time division multiple access (TDMA), multi-carrier code division multiple access (MC-CDMA), orthogonal frequency division multiplex multiple access (OFDM-MA), and any combination of the aforementioned techniques. These multiple access techniques are deployed in conjunction with a frequency division duplex (FDD) or time division duplex (TDD) system, either in a synchronized or an unsynchronized mode.

In an FDMA and OFDM-MA system, each sub-channel is assigned to a single user. In a TDMA system, multiple users share a sub-channel but each of the users is assigned different time slots. In an MC-CDMA system, multiple users share a sub-channel but each of the users uses different orthogonal codes. In an OFDM-MA system, the sub-channels could overlap with each other while in other systems such as TDMA and MC-CDMA, there is no overlap of sub-channels.

The frequencies of the sub-carriers that form one sub-channel are not contiguous. The sub-carriers are selected based on a predetermined permutation. In other words, the sub-carriers in one sub-channel are logically adjacent to each other but not necessarily physically adjacent to each other. One example of a predetermined permutation is Partial Usage Subchannelizaton (PUSC) in the IEEE 802.16e communication standard.

The method described herein involves two aspects: segregated channel allocation and null-steering beamforming. The segregated channel allocation technique divides a cell into segments and significantly reduces multi-cell interference and yet at the same time maintains high spectrum usage efficiency. For example, in a cell with six segregated segments, the segregated channel allocation technique achieves the same level of interference reduction as in a cell with a frequency re-use factor of 6 while the spectrum usage efficiency with a frequency re-use factor of 1 is still maintained. The null-steering beamforming method creates an antenna beam pattern that enhances the desired signal and suppresses the interference signal. In addition, the efficiency of the method is not limited by the spreading gain of the system, but rather, it complements a pseudorandom noise offset method.

Figure 1A:
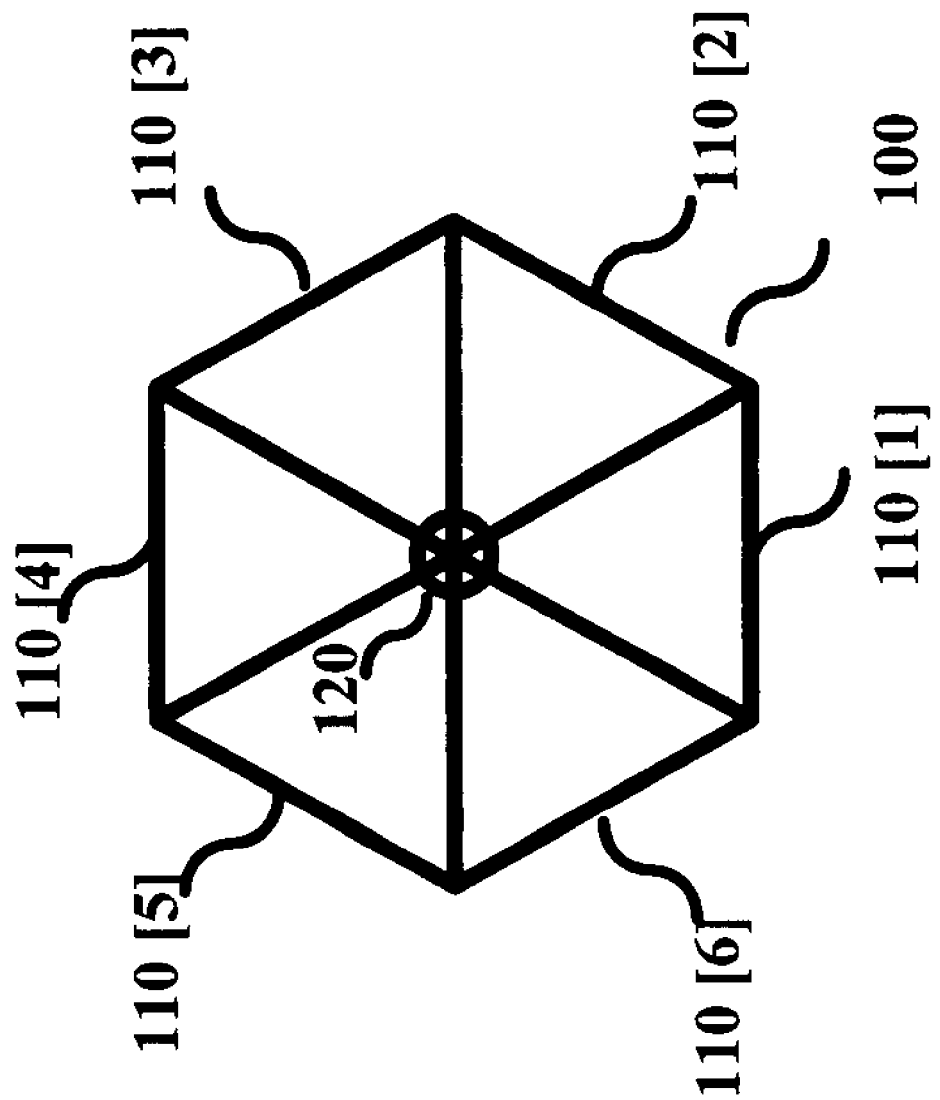
FIG. 1A shows a cell with a 360-degree central angle.

FIG. 1A shows a cell 100 with a central angle of 360 degrees. A BTS is located at the center 120. The cell 100 is divided into six equal segments 110[1:6], each of which has a 60-degree central angle.

Figure 1B:
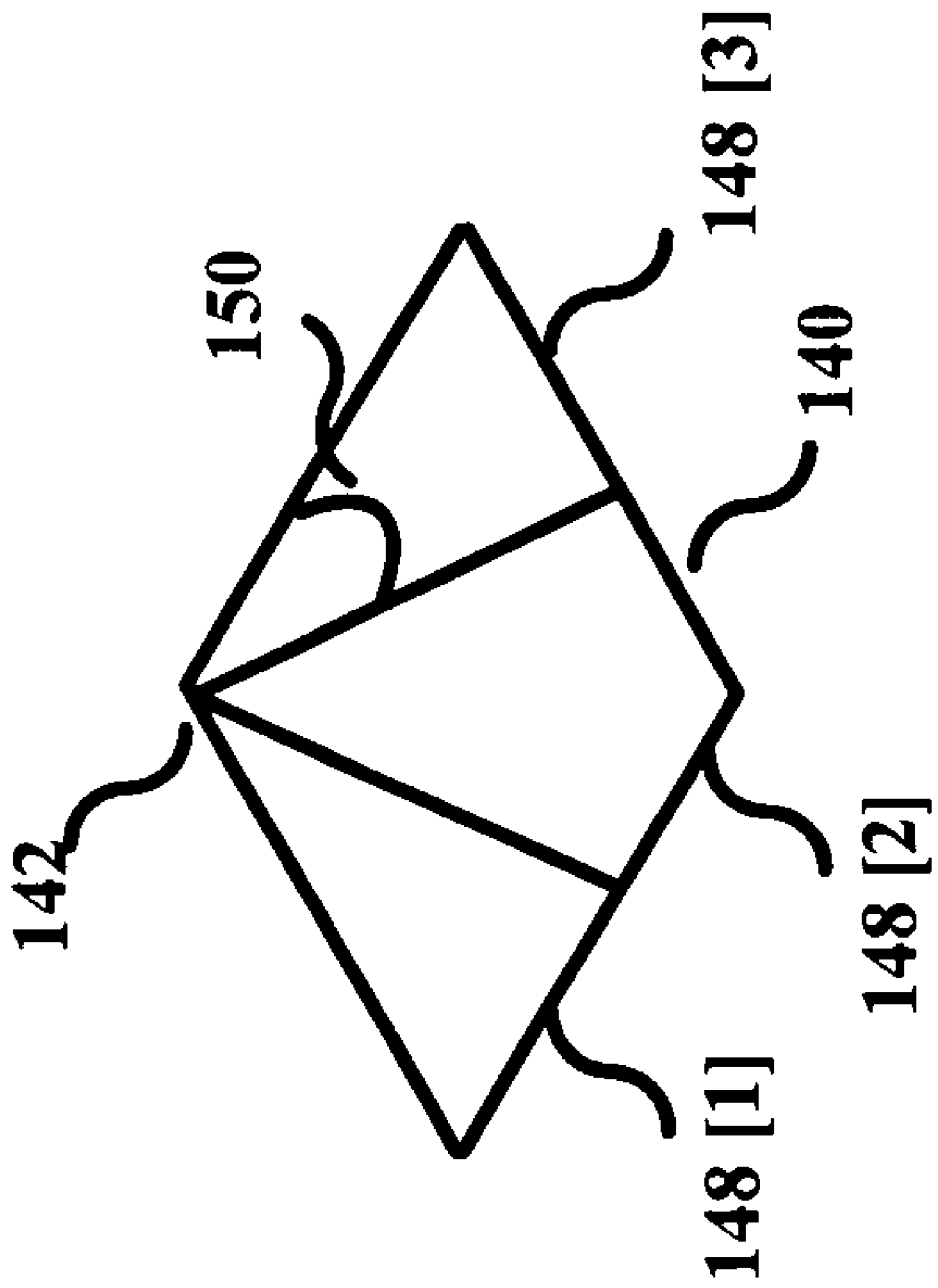
FIG. 1B shows a cell with a vertex angle of 120 degrees.

FIG. 1B shows another example of dividing a cell 140 into three segments. A BTS is located at a vertex 142 which has a 120 degrees angle. In this case, the cell 140 is divided into three segments 148[1:3] with approximately equal vertex angles at the BTS location 142. The vertex angle 150 of one of the segment 148[3] approximately 40 degrees as shown in FIG. 1B.

In either case, the BTS plans a frequency usage assignment for each segment of the cell, with each segment assigned a channel with a different frequency. The channels are assigned in such a way that the probability of having the channels at the cell boundaries assigned the same frequencies is minimized.

Figure 2:
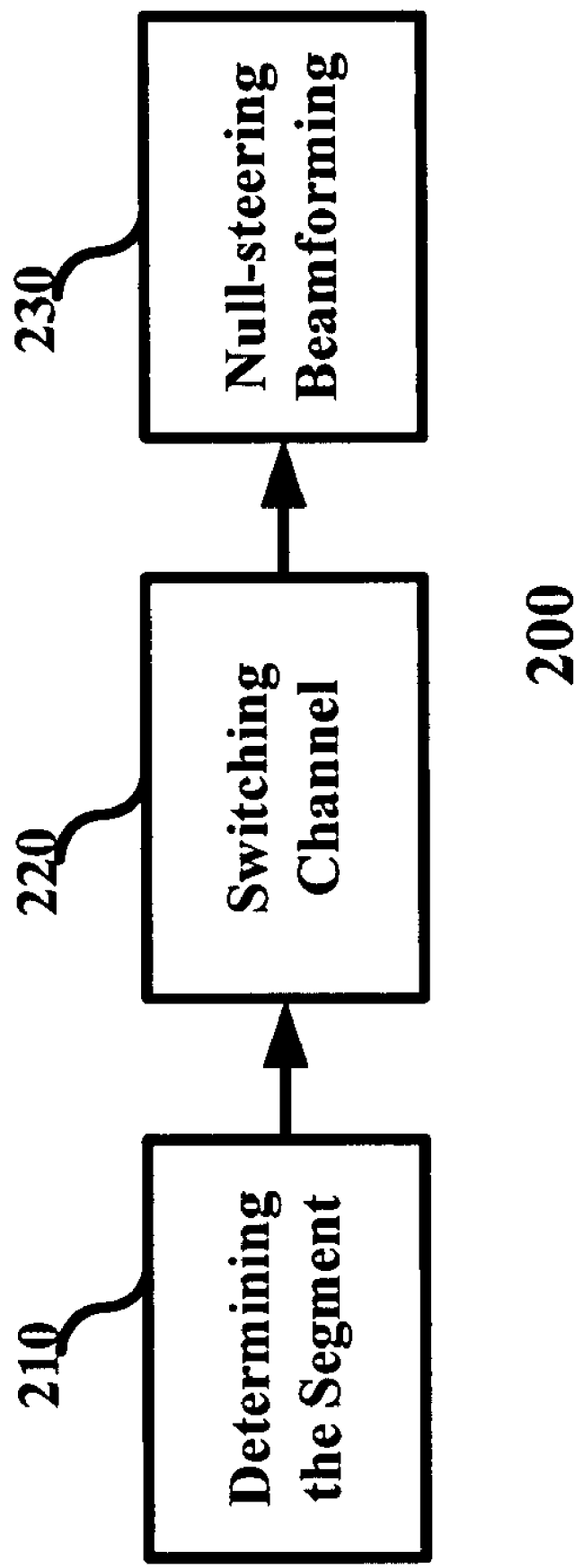
FIG. 2 is a flow diagram illustrating a method for reducing cell interference in accordance with one embodiment.

FIG. 2 is a flow diagram illustrating a method for reducing cell interference in accordance with one embodiment of the present invention. Steps 210 and 220 depict segregated channel allocation while step 230 illustrates null steering beamforming.

In step 210, a BTS learns the location of an MS in its cell by receiving its location information explicitly from the MS or by detecting the location based on a receiving signal from the MS. Then the BTS instructs the MS to use a frequency of the channel assigned to the segment according to segment information in step 220.

Dividing the cell into multiple segments reduces inter-cell interferences. To further reduce that, the BTS employs a null-steering beamforming method with an adaptive antenna array in step 230. Desired signals are sent to the MS in the segment via an appropriate channel.

Figure 3:
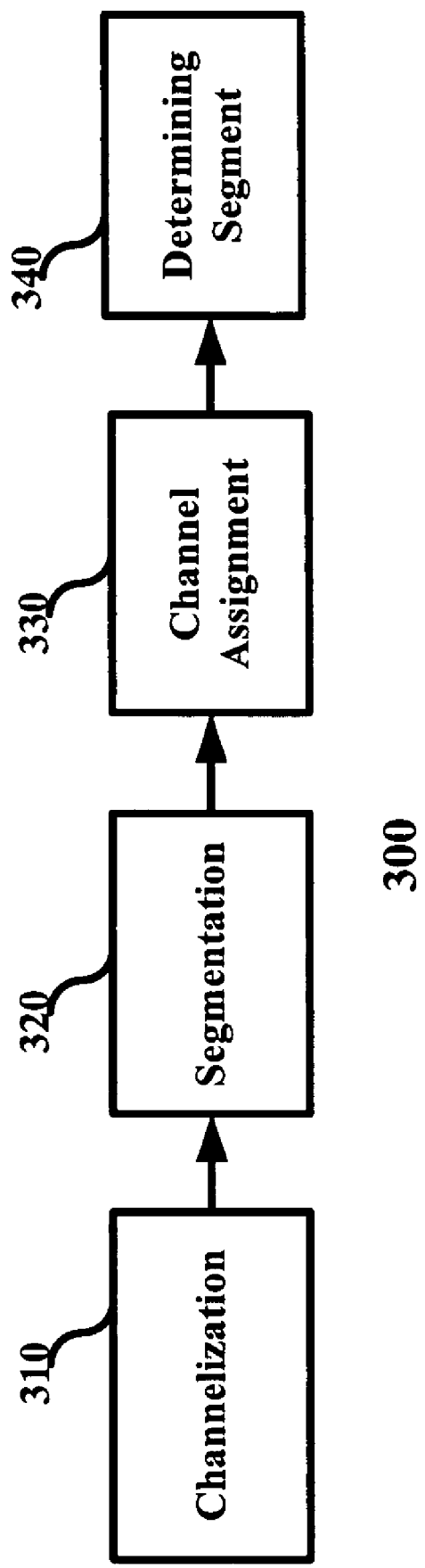
FIG. 3 is a flow diagram illustrating a method for allocating segregated channels.

FIG. 3 is a flow diagram illustrating segregated channel allocation in detail. First, a BTS divides a frequency spectrum allocated to a cell into N sub-channels in step 310. This is called frequency division channelization. Then the BTS divides the cell into multiple segments in step 320. For example, a cell with a BTS covering 360 degrees can be segregated into six segments, each of which has a 60-degree angle as shown in FIG. 1A. To a cell with a BTS covering 120 degrees, it may be segregated into three segments, each of which has a 40-degree angle as shown in FIG. 1B.

In step 330, the BTS assigns a unique group of sub-carriers to each of the segments as a primary channel for the segment. For each segment, the primary channels of its adjacent neighboring segments are considered as its secondary channels, and the primary channels of the next adjacent segments as its tertiary channels, and so on.

For example, in a 6-segment segregation scheme as shown in FIG. 1A, the primary channels of segments 2 and 6 will be the secondary channels of segment 1. The primary channels of segments 3 and 5 will be the tertiary channels of segment 1, and the primary channel of segment 4 will be the quaternary channel of segment 1. The frequencies of the sub-carriers in each channel are not necessarily contiguous. They are selected based on a predetermined permutation. The BTS plans a multi-cell channel allocation in such a way that there are no frequencies overlapped at the cell boundaries.

With the segments in the cell being determined, the BTS detects the location of the MS and subsequently a segment where the MS is located in step 340. The BTS can determine the location of the MS in several ways.

One way to determine the location of an MS is to have a different access channel for each segment. For a BTS equipped with multiple antennas, it can have each antenna point to a different segment in a cell. However, for a BTS equipped with an adaptive antenna array, it can use a beamforming method to create antenna beam patterns with each antenna beam pattern pointing to one segment. The access channels of all the segments in the cell can differ in any of the physical attributes of a communication channel, such as the carrier frequency, phase, magnitude, and pseudorandom noise (PN) offset.

When an MS enters a wireless communications network, it scans and acquires an access channel. The MS sends the BTS an acknowledgement (ACK) message including the information it has acquired via the access channel. By comparing the access channel information received from the MS with the access channel planning map, the BTS determines the segment where the MS is located.

Another way to determine the location of an MS is to use antennas that have different receiving patterns for each segment in the cell. The BTS identifies the antenna that receives the signal with the highest signal strength, which is the desired signal, and it subsequently determines the segment where the MS is located.

Yet another way to determine the location of an MS is to compute the direction of arrival (DOA) of the uplink signal. A BTS equipped with multiple antennas is able to compute the DOA of the receiving signals from a MS, based on the magnitudes and phases of the signals received from different antennas. Using the DOA information, the BTS determines the segment where the MS is located.

Figure 4:
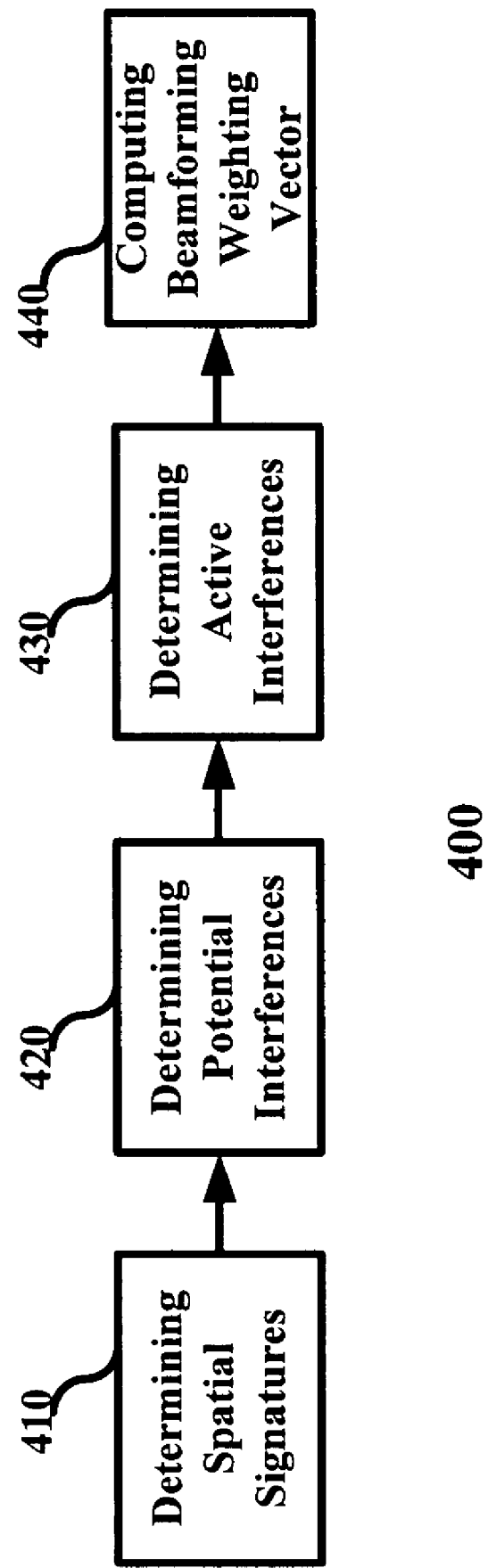
FIG. 4 is a flow diagram illustrating a method for null-steering beamforming.

FIG. 4 is a flow diagram illustrating null-steering beamforming in detail. In a null-steering beamforming method, computing a beamforming weighting vector requires spatial signatures of both the desired and the interference signals. The null-steering beamforming weighting vector creates an antenna beam pattern that enhances the desired signal and suppresses the interference signal.

In step 410, the BTS determines the spatial signatures of both the desired signals and the interference signals. The MSs in the neighboring cells transmit uplink signals with orthogonal coding sequences. The BTS not only receives the uplink signals from the MSs in its own cell but also those from the MSs in the neighboring cells. Based on the received uplink signals, the BTS determines the spatial signatures of the desired signals.

In step 420, the BTS determines what the potential multi-cell interference sources are. When the BTS detects an uplink sounding signal from an MS in a neighboring cell, it compares the signal strength of this signal with a predetermined threshold. If the signal strength is larger than the predetermined threshold, the MS is identified as one potential multi-cell interference source.

If the BTS detects more than one uplink sounding signal from one or more neighboring cells, the signal strength of all the uplink sounding signals from the neighboring cells are compared with a predetermined threshold. If the signal strength is larger than the predetermined threshold, the MSs with the strongest uplink sounding signals are identified as the potential multi-cell interference sources. The spatial signatures of the interference signals are calculated from the receiving signals of the potential multi-cell interference sources.

In step 430, the BTS determines the active multi-cell interference sources. The BTS exchanges uplink sounding signal allocation information with all the other BTSs in every transmission cycle. The BTS determines whether an MS is an active multi-cell interference source based on the uplink sounding signal allocation information sent by the other BTSs.

The covariance matrix of the interference signals is calculated based on the following equation:

$$R_I = \sum_{k=1}^{K} R_{I,k},$$

where $R_{I,k}$ is the covariance matrix of one interference source k.

In step 440, the BTS computes a null-steering beamforming weighting vector by finding the eigenvector corresponding to the largest eigenvalue of the following eigenvalue problem: $(R_I + \sigma_n^2 I)R_S \cdot \vec{w} = \lambda \vec{w}$, where $R_I$ is the covariance matrix of the interference; $\sigma_n^2$ is the covariance of the background noise; I is an identity matrix; and $R_S$ is the covariance matrix of the desired signals.

The above illustration provides many different embodiments. Specific embodiments of components and processes are described to help clarify the subject matter. These are, of course, merely embodiments and are not intended to be limiting.

Although the subject matter is illustrated and described herein as embodied in one or more specific examples, it is nevertheless not intended to be limited to the details shown, since various modifications and structural changes may be made therein without departing from the spirit thereof.

What is claimed is:

1. A method comprising:
   dividing a cell that is served by a base station into a plurality of segments;
   partitioning a frequency spectrum in which the base station transmits and receives signals in the cell into a plurality of sub-channels, where each sub-channel comprises a plurality of subcarriers;
   assigning a different sub-channel as a primary channel which the base station uses in each of a corresponding one of the plurality of segments such that segments within the cell are allocated different portions of the same spectrum for their corresponding primary channels;
   determining at the base station which of the plurality of segments a desired wireless mobile station enters the cell;
   calculating a first spatial signature associated with signals received at the base station from the desired wireless mobile station;
   calculating a second spatial signature associated with an interference signal received at the base station from one or more wireless mobile stations in one or more neighboring cells; and
   generating a beamforming weighting vector from the first and second spatial signatures used by the base station to enhance signals associated with the desired wireless mobile station and to suppress the interference signal.

2. The method of claim 1, and further comprising at the base station assigning one or more sub-carriers to sub-channels based on a predetermined permutation.

3. The method of claim 1, wherein assigning comprises assigning sub-channels as primary channels to respective segments of the cell such that for each segment, the primary channels of its adjacent neighboring segments are used as secondary channels, the primary channels of its next adjacent segments are used as tertiary channels, and so on.

4. The method of claim 1, and further comprising at the base station receiving an acknowledgement message from the desired wireless mobile station, wherein determining comprises determining which of the plurality of segments the desired wireless mobile station enters the cell based on the acknowledgement message.

5. The method of claim 4, wherein receiving the acknowledgement message comprises receiving the acknowledgement message transmitted on an access channel acquired by the desired wireless mobile station when it enters a segment of the cell, wherein each segment uses a unique access channel.

6. The method of claim 1, wherein determining comprises determining which of the plurality of segments the desired wireless mobile station enters the cell using a plurality of base station antennas are configured to have different receiving patterns for different segments in the cell.

7. The method of claim 1, wherein determining comprises determining which of the plurality of segments the desired wireless mobile station enters the cell by computing a direction of arrival (DOA) of signals transmitted from the desired wireless mobile station and received at the base station.

8. The method of claim 1, wherein calculating the second spatial signature comprises:
   identifying a plurality of potential multi-cell interference sources; and
   identifying a plurality of active multi-cell interference sources.

9. The method of claim 8, wherein identifying the plurality of potential multi-cell interference sources comprises:
   detecting a plurality of uplink signals transmitted by wireless mobile stations in the neighboring cells; and
   comparing the signal strength of the plurality of uplink signals with a predetermined threshold.

10. The method of claim 9, wherein detecting comprises detecting uplink sounding signals transmitted by wireless mobile stations in the neighboring cells.

11. The method of claim 8, wherein identifying the plurality of active multi-cell interference sources comprises exchanging uplink sounding signal information with at least one base station in a neighboring cell.

12. A method comprising:
   dividing a cell that is served by a base station into a plurality of segments;
   partitioning a frequency spectrum in which the base station transmits and receives signals in the cell into a plurality of sub-channels, where each sub-channel comprises a plurality of subcarriers arranged in accordance with a predetermined permutation;
   assigning a different sub-channel as a primary channel which the base station uses in each of a corresponding one of the plurality of segments such that segments within the cell are allocated different portions of the same spectrum for their corresponding primary channels;
   determining at the base station which of the plurality of segments a desired wireless mobile station enters the cell based on an acknowledgement message received from the desired wireless mobile station at the base station;
   calculating a first spatial signature associated with signals received at the base station from the desired wireless mobile station;
   calculating a second spatial signature associated with an interference signal received at the base station from one or more wireless mobile stations in one or more neighboring cells; and
   generating a beamforming weighting vector from the first and second spatial signatures used by the base station to enhance the signals associated with the desired wireless mobile station and to suppress the interference signal.

13. The method of claim 12, wherein assigning comprises assigning sub-channels as primary channels to respective segments of the cell such that for each segment, the primary channels of its adjacent neighboring segments are used as secondary channels, the primary channels of its next adjacent segments are used as tertiary channels, and so on.

14. The method of claim 12, wherein determining comprises determining in which segment the base station receives the acknowledgement message that is transmitted via an access channel acquired by the wireless mobile station when it enters the cell, wherein each segment uses a unique access channel.

15. The method of claim 12, wherein calculating the second spatial signature comprises:
   identifying a plurality of potential multi-cell interference sources; and
   identifying a plurality of active multi-cell interference sources.

16. The method of claim 15, wherein identifying the plurality of potential multi-cell interference sources comprises:
   detecting a plurality of uplink signals transmitted by wireless mobile stations in the neighboring cells; and
   comparing the signal strength of the plurality of uplink signals with a predetermined threshold.

17. The method of claim 16, wherein detecting comprises detecting uplink sounding signals transmitted by wireless mobile stations in the neighboring cells.

18. The method of claim 17, wherein identifying the plurality of active multi-cell interference sources comprises exchanging uplink sounding signal information with at least one base station in a neighboring cell.

19. A method comprising:
   dividing a cell that is served by a base station into a plurality of segments;
   partitioning a frequency spectrum in which the base station transmits and receives signals in the cell into a plurality of sub-channels, where each sub-channel comprises a plurality of subcarriers;
   assigning a different sub-channel as a primary channel which the base station uses in each of a corresponding one of the plurality of segments such that segments within the cell are allocated different portions of the same spectrum for their corresponding primary channels;
   determining at the base station which of the plurality of segments a desired wireless mobile station enters the cell;
   calculating a first spatial signature associated with signals received at the base station from the desired wireless mobile station;
   identifying a plurality of potential multi-cell interference sources and a plurality of active multi-cell interference sources associated with a plurality of wireless mobile stations in one or more neighboring cells;
   calculating a second spatial signature associated with interference signals from the plurality of potential and active multi-cell interference sources; and
   generating a beamforming weighting vector from the first and second spatial signatures used by the base station to enhance the signals associated with the desired wireless mobile station and to suppress the interference signals.

20. The method of claim 19, and further comprising at the base station assigning one or more sub-carriers to sub-channels based on a predetermined permutation.

21. The method of claim 19, wherein assigning comprises assigning sub-channels as primary channels to respective segments of the cell such that for each segment, the primary channels of its adjacent neighboring segments are used as secondary channels, the primary channels of its next adjacent segments are used as tertiary channels, and so on.

22. The method of claim 21, and further comprising at the base station receiving an acknowledgement message from the desired wireless mobile station, wherein determining comprises determining which of the plurality of segments the desired wireless mobile station enters the cell based on the acknowledgement message.

23. The method of claim 22, wherein receiving the acknowledgement message comprises receiving the acknowledgement message transmitted on an access channel acquired by the desired wireless mobile station when it enters a segment of the cell, wherein each segment uses a unique access channel.

24. The method of claim 19, wherein determining comprises determining which of the plurality of segments the desired wireless mobile station enters the cell using a plurality of base station antennas are configured to have different receiving patterns for different segments in the cell.

25. The method of claim 19, wherein determining comprises determining which of the plurality of segments the desired wireless mobile station enters the cell by computing a direction of arrival (DOA) of signals transmitted from the desired wireless mobile station and received at the base station.

26. The method of claim 19, wherein identifying the plurality of potential multi-cell interference sources comprises:
   detecting a plurality of uplink signals transmitted by wireless mobile stations in the neighboring cells; and
   comparing the signal strength of the plurality of uplink signals with a predetermined threshold.

27. The method of claim 26, wherein detecting comprises detecting uplink sounding signals transmitted by wireless mobile stations in the neighboring cells.

28. The method of claim 19, wherein identifying the plurality of active multi-cell interference sources comprises exchanging uplink sounding signal information with at least one base station in a neighboring cell.

* * * * *